May 3, 1932. K. W. SOMMER ET AL 1,856,439
CONFORMATOR GAUGE
Filed Jan. 4, 1929
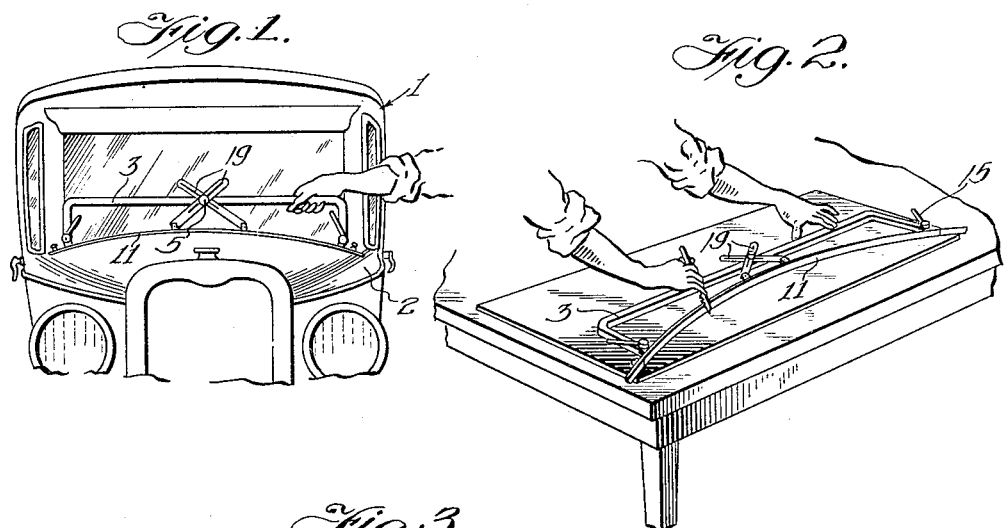
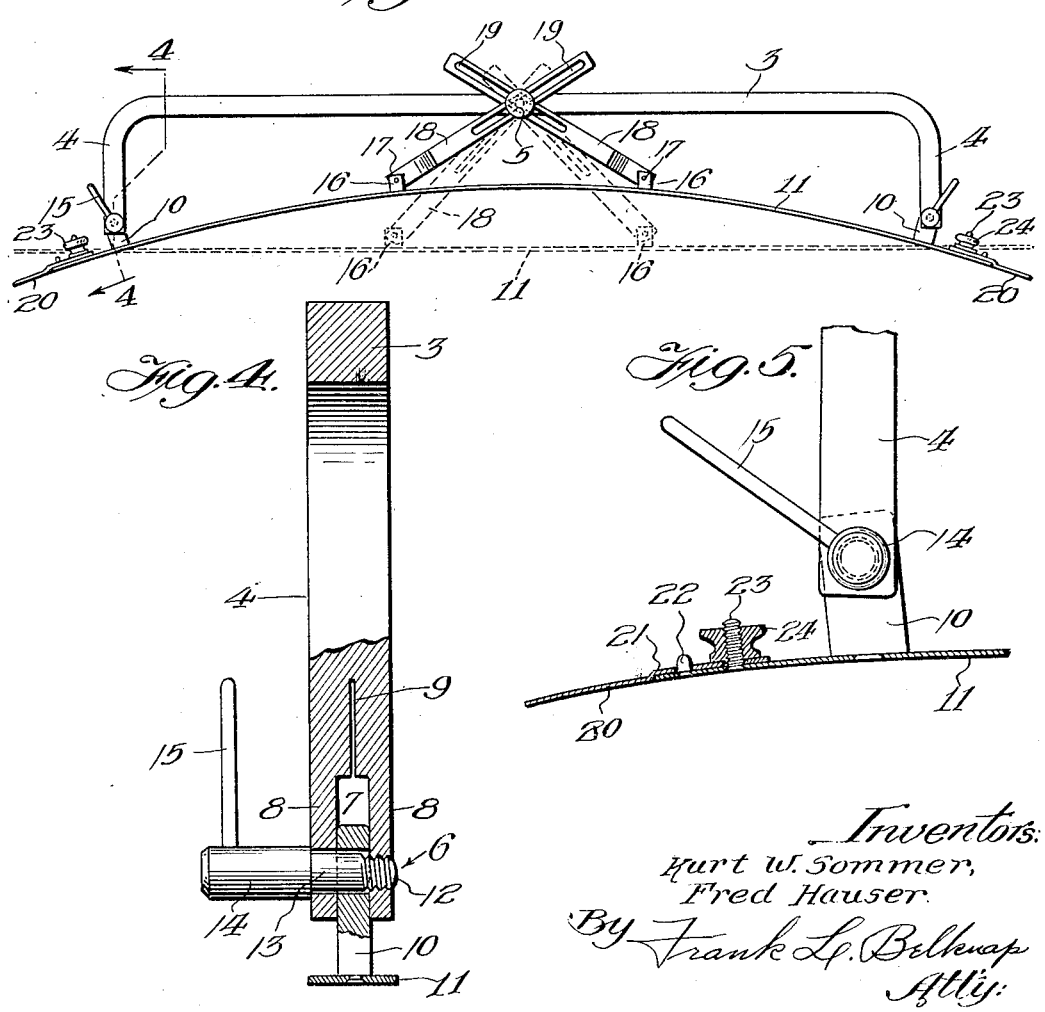
Inventors:
Kurt W. Sommer,
Fred Hauser.
By Frank L. Belknap
Atty.

Patented May 3, 1932

1,856,439

UNITED STATES PATENT OFFICE

KURT W. SOMMER, OF CICERO, AND FRED HAUSER, OF CHICAGO, ILLINOIS, ASSIGNORS TO SOMMER AND MACA GLASS MACHINERY CORPORATION, OF CHICAGO, ILLINOIS, A CORPORATION OF ILLINOIS

CONFORMATOR GAUGE

Application filed January 4, 1929. Serial No. 330,324.

Our invention relates to an improved gauge, and particularly to a gauge which is adjustable to conform to any curve within a desired range, whereby it may be employed in cutting glass or other sheet material, which material is to be cut on a particular curved line.

In many automobiles now in use, the windshields at their lower edge closely fit the cowl of the car body on a curved line, and also in mirrors frequently the glass is curved and fits in a similarly shaped frame. To supply glass for such usage, either in the case of initial installation or repair, it is necessary to provide the glass cut with a particular curve which will effect an accurate and close fit in the frame in which it is to be mounted.

It is particularly desirable to have an accurate fit in the case of automobile windshields, in that rain, wind and dirt will find their way into the automobile between the cowl and lower edge of the glass in the event any clearance occurs at this point. In making repairs, particularly where no pattern is handy by which the glass can be cut, it is very difficult to determine the curve which will assure the proper fit, due to the fact that the line of contact between the lower edge of the glass and the cowl is almost, without exception, located near the body structure and at the bottom of a narrow slot through which it is almost impossible to ascertain the true nature of the curve without the aid of some special instrumentalities.

Accordingly, one of the objects of my invention is to provide a gauge or adjustable guide which may be used as a guide in installing glass in the above described manner and with which the desired curve may be quickly and accurately determined.

It is a further object of my invention to provide a gauge of the above described type which may accurately be centered and maintained in proper position both at the time of adjustment to conform to the particular curve and at the time the gauge is being employed as a guide for the glass cutting operation, it being understood that my gauge is to be employed as a guide for determining the path of the cutting instrument during the cutting operation.

It is a further object of the invention to provide a gauge simple in construction, quickly adjustable and devoid of complicated parts.

Further objects and advantages will be more particularly apparent from the following description.

In the drawings Fig. 1 is a fragmentary elevational view illustrating the application of the gauge to the cowl of an automobile.

Fig. 2 is a graphic illustration illustrating the use of the gauge as a guide in the cutting of glass having a curved edge.

Fig. 3 is an enlarged elevational view illustrating the gauge of the present invention, dotted lines indicating the extent of adjustment possible by the use of the gauge.

Fig. 4 is an enlarged cross sectional view taken on line 4—4 of Fig. 3.

Fig. 5 is a fragmentary elevational view partly in vertical section of one end of the gauge illustrating the side locking element and removable extension.

Referring more in detail to the drawings, 1 designates as a whole an automobile and 2 the cowl thereof. In a great many of the automobiles in use today the cowl is curved transversely of the body of the automobile. This makes it necessary that the base of the windshield be curved to conform to the curvature of the cowl, and it is important that the fit between the base of the windshield and the cowl be as accurate as possible to resist the entrance of wind, rain, snow, et cetera.

The adjustable gauge of the present invention comprises a rigid bar 3 of any desired length provided with the turned down ends 4. Intermediate the length of the bar 3 it is provided with an aperture for the reception of the adjustable screw 5. Adjacent each end of the turned down ends 4 we provide a similar aperture for the reception of the locking screw designated as a whole 6. By reference to Fig. 4 it will be noted that in one embodiment of the invention, each end 4 is bifurcated to provide a recess 7 intermediate the retaining legs 8. The recess 7 communicates with an elongated slot 9 extending into the arm 4, the arrangement being such that as pressure is applied to the element 6, the legs 8 will be forced together, to securely grip the lugs 10 projecting upwardly and fixedly attached to the flexible strip 11.

In the particular construction shown in Fig. 4, the element 6 takes the form of a screw thread 12 of restricted length adapted to register with the screw threaded wall of an aperture in the inner leg 8 of the extensions 4. An unthreaded portion 13 is interposed between the screw threaded portion 12 and the enlarged portion 14 to which is attached the manipulating handle 15, the portion 13 being of a length substantially equal to or less than the width of one leg 8 and the lug 10. Thus, when it is desired to securely grip the lug 10 between the opposed faces of the legs 8, assuming the assembly is loosened, the handle 15 is turned in the desired direction causing the screw threaded portion 12 to screw in until the end of the portion 13 prevents any further movement, the inner face of the portion 14 at that time contacting the wall surrounding the aperture in the outer leg 8. Continued force then applied to the handle 15 will cause the inner faces of the legs 8 to frictionally grip the faces of the lug 10 and securely lock the lug 10 in that position to prevent any unintended movement.

The flexible strip 11 is preferably made of spring steel or the like, the lugs 10 being rigidly attached thereto by riveting, welding or the like. Intermediate the length of the flexible strip 11 and between adjacent lugs 10 the strip 11 may be provided with additional rigidly attached lugs 16 having apertures through which pins 17 may be inserted to connect links 18 therewith in the manner illustrated particularly in Fig. 3. Each link 18 is provided with an elongated closed slot 19 intermediate its length. In use, two adjacent links are placed across each other in such a manner that the slots 19 register with the aperture provided intermediate the length of the bar 3, the screw 5 being provided to lock the adjustable links 18 in any desired position of adjustment.

When not in use, the device of the present invention may be adjusted to assume the position illustrated in dotted lines in Fig. 3 of the drawings, wherein I have illustrated the flexible strip 11 as being straight. For the purpose of description it will be assumed that the elements 5 and 6 have been loosened. The device is then placed on the cowl of the automobile in such a manner that the broad face of the strip 11 contacts the surface of the cowl, while the rod 3 is held as indicated in Fig. 1. After centering the device and observing that the strip 11 conforms to the contour of that particular cowl, the screw bolt 3 is tightened to cause the strip to assume the curved position indicated in full lines in Fig. 3; at the same time the adjustable elements 6 are tightened to cause the opposed faces of the legs 8 to frictionally grip the lug 10, locking the assembly in the curved position desired.

The device is then placed on a sheet of glass, as indicated in Fig. 2, and a cutting element is applied to the glass along the curved edge of the strip 11. That side of the device which is laid on the glass during the cutting operation may have applied thereto strips of felt, rubber or other cushioning or friction material to prevent slipping of the device during the cutting operation and to prevent breakage or scratching of the glass.

Another feature of the present invention will now be described. The strip 11 as marketed may be restricted to the length of the shortest cowl conventionally used. At the present time, the cowl of the least width will use a strip approximately 38 inches long. However, other types of automobiles have cowls of greater length, up to 46 inches. Should a greater length be required, it is only necessary to attach the proper length extension 20 to the edge of the strip 11. The extensions 20 comprise felt strips of metal approximately the same in width and thickness as the strip 11, and come in lengths from one to six inches, more or less, the length being measured from the edge of the strip 11 to the edge of the extension 20.

The extensions 20 are provided with an offset portion 21, which offset portion is provided with two apertures, one adapted to register with the upstanding lug 22 rigidly attached to the strip 11 immediately adjacent the end thereof, and the other aperture being adapted to register with a screw 23 also rigidly attached to and carried by the strip 11 adjacent the lug 22. A thumb nut 24 is adapted to cooperatively engage the screw 23 to rigidly connect the extension 20 with the strip 11.

From the foregoing it will be apparent that we have provided a simple, quickly adjustable gauge particularly designed to be used as a guide in cutting windshields for curved cowls. The gauge can be adjusted to any kind of a curve in a very short time, considerably less than one minute. This is possible through the use of a very small number of adjustable elements 5 and 6. No extra spring steel edge or other elaborate mechanism is necessary to extend the length of the gauge, the means we have devised for extending the gauge being simple in construction and capable of quick application. In marketing the device, extensions 20, each of the different sizes used, are provided.

In the use of the gauge in determining the curvature by application of it to the cowl, it is preferable to first bear down on the frame to form the desired curve, then tighten the intermediate screw 5 and then the end screws 6.

We have illustrated the device as utilizing a pair of arms 18 and one screw 5. It is obvious that while this is one of the features of the invention from the standpoint of simplicity and elimination of parts, the invention is not to be restricted in any way, since we may use a number of pairs of links 18 and screws 5 connected and operable in the same manner as the links 18 and screw 5 are connected and operable. It should be understood also that we may use any type of locking element which will accomplish the same purpose in place of the particular elements 5 and 6 shown.

This gauge may be employed in any installing operation where it is necessary to cut sheet material with a curved or irregular edge in a manner to conform to the curve of a frame or other cooperating part. In such a case the gauge is positioned and adjusted in a manner to bring the flexible strip 11 in conformity with the curve or irregular edge and is locked in the adjusted position. The gauge may be then placed on a sheet material and employed as a guiding edge for a cutting tool.

We have illustrated two arms 18 in crossed relationship. It is obvious that only one arm may be employed positioned substantially centrally of the strip and projecting substantially vertically. We have also illustrated the provision of elongated slots 19. It is obvious, of course, that equivalents, such as teeth, et cetera, may be employed with equal facility.

We claim as our invention:

1. In combination, a unitary rigid frame comprising an elongated strip having turned down ends, a flexible strip pivotally mounted upon said rigid frame at the turned down ends, and adjustable means at each end and also intermediate the elongated portion of the rigid frame for locking the flexible strip in any position of adjustment, said intermediate adjustable means being pivotally connected with said flexible strip.

2. In combination, a rigid frame comprising an elongated strip having turned down ends, a flexible strip pivotally mounted upon said rigid frame at the turned down ends, and adjustable means at each end and also intermediate the elongated portion of the rigid frame for locking the flexible strip in any position of adjustment, and a removably mounted extension associated with said flexible strip for increasing the length of the flexible strip, said extension forming a continuation of said flexible strip.

3. In combination, a rigid frame comprising an elongated strip having turned down ends, a flexible strip pivotally mounted upon said rigid frame at the turned down ends, and adjustable means at each end and also intermediate the elongated portion of the rigid frame for locking the flexible strip in any position of adjustment, the adjustable means intermediate the elongated portion of the rigid frame comprising crossed arms connected to and projecting upwardly from the flexible strip, and an adjustable screw associated with the elongated portion of the rigid frame for locking the crossed arms.

KURT W. SOMMER.
FRED HAUSER.